United States Patent [19]

Carlson et al.

[11] 3,972,273

[45] Aug. 3, 1976

[54] VALVE ASSEMBLY WITH WATER DISPERSING AND SPREADING SYSTEM

[75] Inventors: Richard H. Carlson, Cumberland, R.I.; Youn H. Ting, Attleboro, Mass.

[73] Assignee: Texas Instruments Incorporated, Dallas, Tex.

[22] Filed: Mar. 3, 1975

[21] Appl. No.: 554,384

[52] U.S. Cl. ................................ 99/300; 99/305; 99/307
[51] Int. Cl.² ....................................... A47J 31/00
[58] Field of Search ..................... 99/307, 293–294, 99/295, 299, 300, 302, 304, 305, 306–307, 346; 137/61.1, 331; 236/93, 101; 239/597, 601

[56] References Cited
UNITED STATES PATENTS

| | | | |
|---|---|---|---|
| 2,829,583 | 4/1958 | Leonard | 99/305 X |
| 3,219,141 | 11/1965 | Williamitis | 236/93 UX |
| 3,416,735 | 12/1968 | Reed | 239/597 X |
| 3,443,508 | 5/1969 | Reynolds et al. | 99/305 X |
| 3,450,342 | 6/1969 | Arledge, Jr. | 236/101 E X |
| 3,462,085 | 8/1969 | Nugarus | 239/601 X |
| 3,490,356 | 1/1970 | Peterson et al. | 99/300 |
| 3,606,169 | 9/1971 | West | 239/597 |
| 3,709,204 | 1/1973 | Noponen | 236/93 X |

Primary Examiner—Leonard D. Christian
Assistant Examiner—Arthur O. Henderson
Attorney, Agent, or Firm—John A. Haug; James P. McAndrews; Russell E. Baumann

[57] ABSTRACT

A valve assembly with a water dispersing and spreading system preferrable for use in drip-type beverage maker comprising a housing having a passage extending therethrough with the passage having an inlet, an outlet, and a valve seat therebetween. A thermostatic dish-shaped snap-acting bimetallic disk constitutes the valve member and is positioned in the passage in engagement with the valve seat thereby to block communication through the passage while in the first curvature position and while in the second curvature position to move clear of the valve seat to permit the flow of fluid therepast. The disk is movable from the first curvature position to the second and back again upon changes in temperature of the disk. A spring member biases the disk toward the valve seat in sealing engagement when the disk is in its first curvature position. An abutment in the housing engageable by the center portion of the disk as the disk moves to its second position insures that the periphery of the disk moves clear of the valve seat. In communication with the outlet passage, a plurality of outwardly curved channels are formed in the housing with a dispersing disk centrally blocking the outlet and thereby forcing the flow of fluid through the channels in a radially outward direction.

10 Claims, 4 Drawing Figures

3,972,273

VALVE ASSEMBLY WITH WATER DISPERSING AND SPREADING SYSTEM

BACKGROUND AND SUMMARY OF THE INVENTION

This invention relates to a valve assembly with an internal fluid distribution system and more particularly to a dump valve useful in a drip-type coffee or other beverage maker which contains an integral water dispersing and spreading system upon dumping of fluid into a brewing chamber or the like.

In order to obtain uniformly good coffee, the hot water must be distributed over all of the coffee grounds and not just at a center dump point of a valve. This necessitates the use of a dispersing system to spread the water coming out of the valve onto the coffee grounds. The dispersing requirement involves the use of an external distribution system in the design of a coffee maker and the associated cost, manufacturing problems and reliability factors.

Among the several objects of this invention is to provide a valve assembly which contains an integral water dispersing and spreading system to permit a relatively high rate of flow of liquid therethrough. Another object of this invention is to provide a valve which may readily be installed as a unit in an appliance such as a drip-type coffee maker. Still another object of this invention is to provide a valve of sanitary construction for use with food, potable liquids, and the like. Yet another object of this invention is to provide a valve which may be readily manufactured at a low cost and which is reliable in operation. Other objects and features of this invention will be in part apparent and in part pointed out hereinafter.

Briefly, the valve assembly of this invention comprises a housing having a passage extending therethrough with an inlet and an outlet therein and a valve seat between the inlet and the outlet. A snap-acting, dish-shaped bimetallic disk preferably constitutes the valve member and snaps back from a closed valve position to an open valve position and back again in response to temperature changes of the disk. A spring member biases the bimetallic disk toward the closed valve position to insure proper sealing and an abutment in the housing engageable by the center portion of the disk as the disk moves to the open valve position insures the disk is clear of the O-ring to permit the flow of liquid therethrough. In the housing at the outlet of the passage and in communication therewith a plurality of outwardly curved channels are formed to provide flow paths for the fluid out of the valve. A dispersing disk is centrally mounted to block the fluid coming from the outlet of the passage and cause it to exit through the outwardly curved channels.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
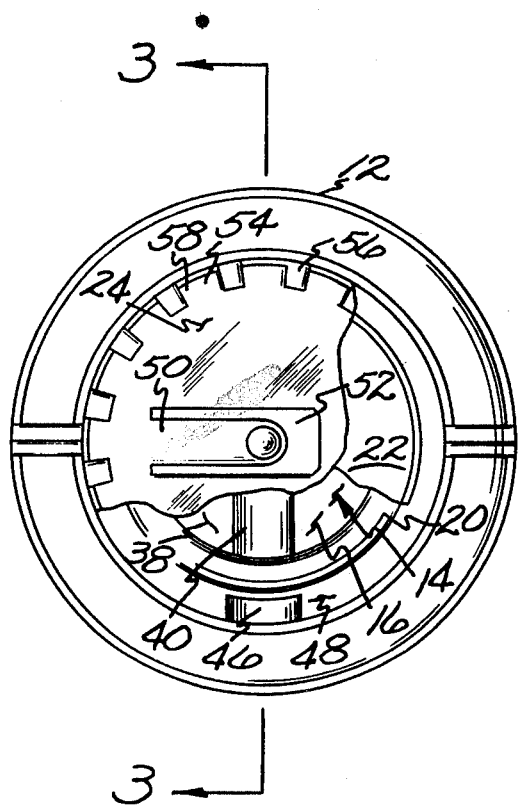
FIG. 1 is a top plan view of the dump valve of this invention with some parts broken away for clarity.
Figure 2:
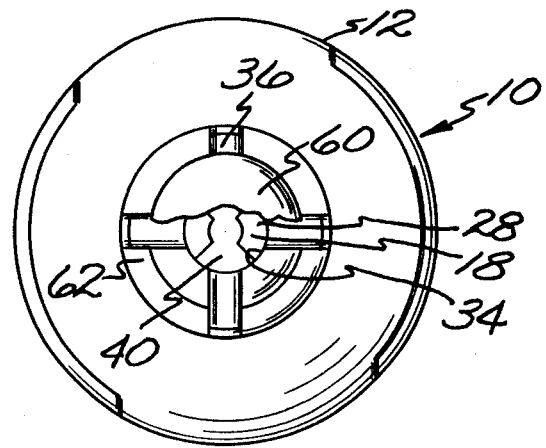
FIG. 2 is a bottom plan view of the dump valve of this invention with the dispersing disk partially broken away for clarity.
Figure 3:
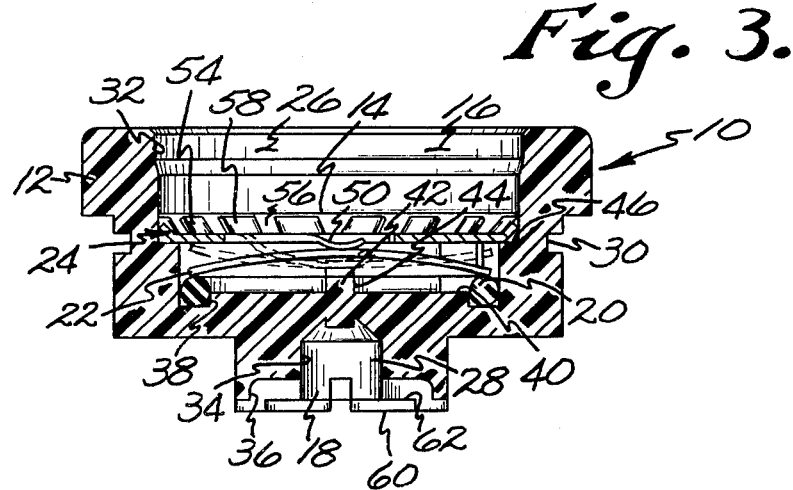
FIG. 3 is a vertical section view taken along line 3—3 of FIG. 1 showing in solid lines the valve in its closed position and in broken lines the valve in its open position.

Referring now to the drawings, a dump valve assembly of this invention is indicated at 10 in FIGS. 1–3 and is shown to comprise a housing 12 of a suitable molded material, such as thermosetting synthetic resin material. Housing 12 has a central passage 14 with an inlet 16 and outlet 18 and an O-ring 20 constituting a valve seat therebetween. O-ring 20 may be made from a resilient flexible material such as rubber. A snap-acting dish-shaped bimetallic member 22 preferrably serves as the valve member and is positioned in passage 14. Disk 22 may be nickel or tin plated to provide the corrosion resistance needed to keep the disk in sanitary condition. Disk 22 has a first curvature position in which the disk is bowed toward O-ring 20 as shown by the solid line position in FIG. 3 and a second curvature position to which it snaps at a first pre-established temperature in which it is out of engagement with O-ring 20 as shown by the dashed line position in FIG. 3. Disk 22 is automatically reversibly movable from its second curvature position to its first curvature position to close the dump valve upon being subjected to a second pre-established temperature.

Dump valve 10 further includes a resilient retaining spring member 24 as shown by FIGS. 1 and 3 for biasing valve disk member 22 toward O-ring 20. This biasing means holds the disk in positive sealing engagement with the O-ring 20 when the disk is in its first or closed position. It will be understood that the biasing means exerts a force sufficient to maintain sealing engagement of the disk with the O-ring, but does not permit the application of excessive forces to the O-ring which could cause a compression set of the elastomer so as to permanently deform the O-ring and thus cause leakage.

Figure 4:
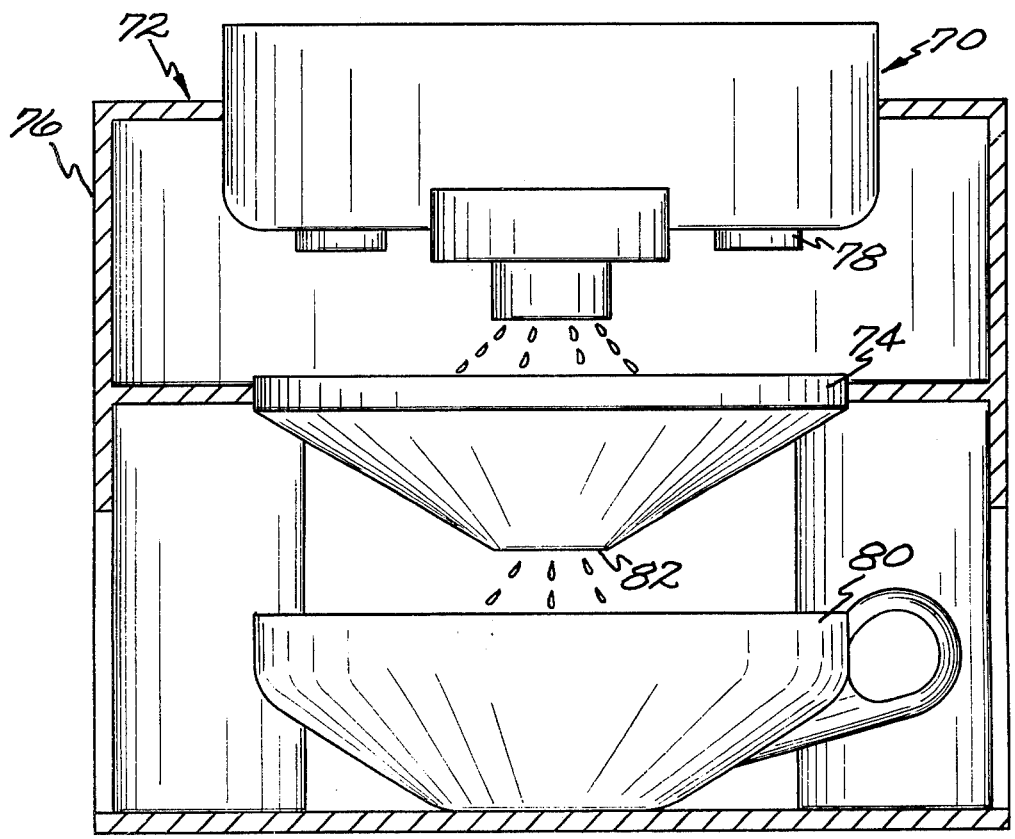
FIG. 4 is a verticle section view of the dump valve of this invention positioned in a drip-type beverage maker.

Housing 12 is generally circular in cross-section and has a relatively large diameter inlet portion 26 and a relatively small diameter outlet portion 28. The outside of inlet portion 26 is provided with locking means 30 for sealingly securing dump valve 10 in the opening of the bottom wall of a water reservoir 70 for drip-type coffee maker 72 as shown in FIG. 4. Locking means 30 may be a twist and seal bayonet type lock which does not require the use of snap rings or other external retainer mechanism. The groove 30 in the outlet of inlet portion 26 serves to lock valve 10 in place. Inlet portion 26 has a generally circular recess 32 therein and outlet portion 28 has an outlet passage 34 therethrough of smaller diameter than recess 32 and in communication with a plurality of channels 36 to be discussed more below. Recesses 32 and 34 are separated by a shoulder 38. Equidistant from the center of housing 12 and positioned on shoulder 38 are four projections 40 spaced 90° apart and made from the same material as the housing. These projections form a frame for O-ring 20 to fit over. Also, two of the projections 40 extend across the inlet end of outlet passage 34 to form a spider with a nob 42 extending up above the level of shoulder 38 and projections 40 thereby to constitute abutment means 44. Abutment means 44 is engageable by the center portion of valve disk 22 as the disk snaps over center from its first closed valve position to its second open valve position to insure valve disk is clear of O-ring 20 to permit the flow of liquid therethrough.

Recess 32 is stepped, as indicated at 46 with this step having notches 48 therein. Disk 22 is of somewhat smaller diameter than the internal cross-section of stepped portion 46 of recess 32 and notches 48 to permit relatively high flow rates of fluid to pass between the peripheral edge of disk 22 and the walls of the recess. Stepped portion 46 also serves as a bottom stop to previously mentioned retainer spring 24. This retainer spring is preferably made of a resilient, flexible material, such as a spring stainless steel or the like. A spring arm 50 is struck from the central portion of the retainer spring, this arm being disposed to extend inwardly in recess 32 for resilient engagement with valve disk 22 thereby to resiliently bias the valve disk into engagement with O-ring 20 when the valve disk is in its first or closed curvature position. A slot 52 in retainer spring 24 resulting from arm 50 being struck therefrom serves as an opening in the spring through which water may also flow. Retainer spring is of somewhat larger diameter than recess 32. The outer margin 54 of disk 22 is bent up and has a plurality of equally spaced slots 56 therearound defining a plurality of spaced tabs 58. Upon forcing the retainer spring into recess 32 until its bottom side engages steps 46, tabs 58 are forced inwardly of the spring and thus forcibly grip the sides of the recess so as to prevent removel of the disk from the recess. It will be understood that slots 56 serve as openings in the disk through which liquid may pass to flow through passage 14.

In accordance with this invention a dispersing disk 60 as shown in FIGS. 2 and 3 is centrally mounted in a cavity 62 in housing 12 at the outlet of outlet passage 34. Dispersing disk 60 has a larger diameter than the diameter of passage 34 to block the flow from the passage into a coffee brewer chamber 74. The disk 60 may be sealed in place by deforming part of housing 12 adjacent cavity 62 to provide a mechanical lock for the disk. The dispersing disk may be made from a resilient material such as a high temperature plastic. At a point between the valve seat and dispersing disk 60, a plurality of channels 36 in communication with passage 34 are formed in housing 12 extending outwardly and downwardly as shown in FIGS. 2 and 3 to route the flow of fluid from the outlet passage around dispersing disk 60. Channels 36 are preferably equally spaced from one another in the housing to provide uniform fluid distribution from the valve to brewing chamber 74. Depending on the ratio of the width to the height of channels 36 different angle of flow can be achieved. For example, with a wide channel of limited depth a conical shape for the fluid distribution can be achieved.

Dump valve 10 may be installed in a coffee maker 72 as shown in FIG. 4 which comprises a frame 76 that is made out of resilient corrosion resistant material such as stainless steel. Frame 76 supports water heating reservoir 70 into which water is placed to be heated by heater coils 78. The water is maintained in the reservoir until it is heated to a desired temperature range (e.g., 180°–195°F.) and dump valve 10 opens. Upon the water being heated to the desired temperature, as determined by the temperature at which valve disk 22 snaps over center from its closed to its open position, the valve disk snaps open (as shown in broken lines in FIG. 3). As the disk snaps from its closed position to its open position, the center portion of the disk moves downwardly and engages or reacts against abutment 44 thereby to prevent further downward movement of the center portion of the disk. This in turn forces the periphery of the disk up clear of O-ring 20 thus opening the valve. With abutment 44 somewhat above the top surface of O-ring 20, the abutment insures that, when the disk is in its second curvature position, the peripheral edges of the disk are spaced above the O-ring a maximum distance corresponding to the shape of the disk when in its second curvature position thereby to insure a high flow rate (or dumping rate) through the valve.

Once the water enters the outlet passage, it is forced through outwardly extending channels 36 around dispersing disk 60 by the dispersing disk to dump the fluid radially out from the center of the valve. This dispersing valve allows the water to be spread over a large area so that it can hit the coffee grounds or other infusion material in the brewer chamber 74. The water passes through the coffee grounds and filter (not shown) and out of brewer chamber 74 through an exit 82 hole into a holding container 80 until served.

After the water has been dumped from reservoir, disk 13 cools below its reset temperature, and the valve disk moves over center from its open to its closed position thereby to close the dump valve. As the valve disk moves off center toward its closed position, spring arm 50 maintains the center of the disk against abutment 42 and thus causes the periphery of the disk to move into engagement with O-ring 20. Upon snapping over center to its first curvature position, the center of the disk lifts free of abutment 42 and the spring arm again maintains the disk seated on O-ring 20.

This integral fluid dispersing and spreading system needs no external spreading means. The channels are formed right in the housing for diverting the flow radially outward from the central outlet passage. The dispersing disk can be easily inserted and removed again if desired for reclaiming valves after field use. The housing can be simply molded in one operation, and is therefore inexpensive to make.

It will be understood that the integral fluid dispersing and spreading systems of this invention can be used with a mechanical valve instead of the described thermal valve.

It will be further understood that valves of this invention intended for use with coffee makers and other food preparation appliances are conveniently made of materials which are resistant to deterioration by the fluids to which they are exposed and which are easily maintained in a sanitary condition.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A valve assembly comprising: a housing having a passage extending therethrough, said passage having an inlet and an outlet with a valve seat therebetween; a valve member engageable with said valve seat; means to move said valve member into or out of engagement with said valve seat; and dispersing means at the outlet of said valve assembly comprising a dispersing disk positioned at said outlet passage and a plurality of channels in communication with said outlet passage which extend radially outward from said outlet passage around said dispersing disk, said dispersing disk blocking the flow of fluid coming from said outlet passage thereby causing said fluid to flow in the plurality of channels.

2. A valve assembly as set forth in claim 1 wherein said plurality of channels are equally spaced apart in said housing to provide uniform radial fluid distribution from said valve.

3. A valve assembly as set forth in claim 2 wherein the plurality of channels is four.

4. A valve assembly as set forth in claim 3 wherein said valve member is a thermostatic dish-shaped bimetallic disk adapted to abruptly snap from a first curvature position in which the outer periphery of said disk is in engagement with said valve seat thereby blocking communication through said passage to a second curvature position in which said disk is clear of said valve seat thereby permitting the flow of fluid therethrough.

5. A valve assembly as set forth in claim 4 in which the means to move said valve member is thermal actuation of the thermostatic snap-acting bimetallic disk valve member.

6. A valve assembly as set forth in claim 5 further including a raised abutment means engageable by the center portion of said bimetallic disk as the bimetallic disk snaps from its first to its second curvature position thereby ensuring the movement of the periphery of said bimetallic disk clear of the valve seat.

7. A valve assembly as set forth in claim 6 further including a retaining spring having means engageable with said housing for securing the retaining spring therein, said retaining spring having a resiliently flexible arm engageable with said bimetallic disk biasing said bimetallic disk toward said valve seat and holding said bimetallic disk in sealing engagement therewith when said bimetallic disk is in its first curvature position.

8. A drip type beverage maker comprising a frame, a reservoir of water supported by said frame, heating means for heating the water in the reservoir, a brewing chamber for receiving water at a predetermined temperature from said reservoir and for having said water pass through infusion material contained therein and out an exit hole into a holding container, and valve means for dispersing the water uniformly within said brewing chamber comprising a housing having a passage extending therethrough, said passage having an inlet and an outlet with a valve seat therebetween, a valve member engageable with said valve seat, means to move said valve member into or out of engagement with said valve seat, and dispersing means at the outlet of said valve assembly including a dispersing disk positioned at said outlet passage and a plurality of channels in communication with said outlet passage which extend radially outward from said outlet passage around said dispersing disk, said dispersing disk blocking the flow of fluid coming from said outlet passage thereby causing said fluid to flow in the plurality of channels.

9. A drip-type beverage maker as set forth in claim 8 wherein said plurality of channels are equally spaced apart in said housing to provide uniform spreading.

10. A drip-type beverage maker as set forth in claim 9 wherein said valve means includes locking means for securing said valve in said reservoir independent of an external retainer mechanism.

\* \* \* \* \*